United States Patent [19]

Michel et al.

[11] Patent Number: 5,625,690

[45] Date of Patent: Apr. 29, 1997

[54] SOFTWARE PAY PER USE SYSTEM

[75] Inventors: Alan D. Michel, Fishers; Robert E. Reinke, Indianapolis, both of Ind.

[73] Assignee: Lucent Technologies Inc., Murray Hill, N.J.

[21] Appl. No.: 152,769

[22] Filed: Nov. 15, 1993

[51] Int. Cl.$^6$ ............................................. H04L 9/00
[52] U.S. Cl. ............................................. 380/4; 380/21
[58] Field of Search ................................... 380/4, 21

[56] References Cited

U.S. PATENT DOCUMENTS

| | | | |
|---|---|---|---|
| 4,433,207 | 2/1984 | Best | 380/21 |
| 4,658,093 | 4/1987 | Hellman | 380/4 |
| 4,847,902 | 7/1989 | Hampson | 380/4 |
| 4,864,494 | 9/1989 | Kobos, Jr. | 380/4 |
| 4,924,378 | 5/1990 | Hershey et al. | 380/4 |
| 4,999,806 | 3/1991 | Chernow et al. | 380/4 |
| 5,103,476 | 4/1992 | Waite et al. | 380/4 |
| 5,138,712 | 8/1992 | Corbin | 380/4 |
| 5,173,938 | 12/1992 | Steinbrenner et al. | 380/21 |
| 5,235,641 | 8/1993 | Nozawa et al. | 380/21 |
| 5,319,705 | 6/1994 | Halter et al. | 380/4 |
| 5,349,643 | 9/1994 | Cox et al. | 380/4 |
| 5,371,692 | 12/1994 | Draeger et al. | 380/4 |
| 5,392,351 | 2/1995 | Hasebe et al. | 380/4 |

OTHER PUBLICATIONS

Advertisement: Crypkey Software Licensing System, "Hardware key like protection without the hardware key," Dr. Dobb's Journal, vol. 18, Issue 13, Dec. 1993, p. 143.

Schneier, Bruce "Untangling Public–Key Cryptography," Dr. Dobb's Journal, vol. 17, Issue 5, May 1992, pp. 16–18, 20, 22, 24, 26, & 28.

"Special Section: Debating Encryption Standards; The Digital Signature Standard Proposed by NIST; and Responses to NIST's Proposal," Communications of the ACM, vol. 35, No. 7, Jul. 1992, pp. 32–34, 36–54.

*Primary Examiner*—Salvatore Cangialosi
*Attorney, Agent, or Firm*—Jeffrey M. Weinick; Donald P. Dinella

[57] ABSTRACT

A pay per use system for of the unauthorized use of computer software. An encryption program encodes original software to produce secured software. The encoding is accomplished by using cryptographic techniques. In order to use the software, a user must call a telephone number to receive the cryptographic keys necessary to decrypt the secured software. Thus, users must pay for each use of the secured software. The system allows software developers to freely distribute the secured software. Copies of the secured software may be freely made, because payment is based on each use of the software not on each copy of the software.

25 Claims, 5 Drawing Sheets

SOFTWARE PAY PER USE SYSTEM

FIELD OF THE INVENTION

This invention relates generally to the protection of computer software from illegal copying. More particularly, this invention relates to a pay per use protection technique in which a user must make a telephone call in order to use protected software.

BACKGROUND OF THE INVENTION

Software piracy, the illegal copying of commercial computer programs, is a major problem in the personal computer industry. Software developers currently have three common techniques to prevent illegal copying of their software. The first is the use of hardware "keys". These keys are devices that attach to a computer's printer port. Before starting, the software attempts to query the key. If there is no response, or an incorrect response, the software will not start. The second technique is the use of a key disk. This is like a hardware key, except the key is a floppy disk that must be in the computer's disk drive. A third technique is to sell copy-protected software. In this technique, the developer puts the program on a floppy disk in such a form that a direct copy of the disk will produce an incorrect copy of the software.

All of the above mentioned techniques have problems. They require developers to incorporate piracy protection into their programs. They are brittle, meaning that once a single copy with the protection circumvented exists, the protection is useless. Also, they cause inconvenience to legitimate users of the software. An ideal protection scheme would make it impossible for people to use commercial software illegally, without posing any inconvenience to the developer or the user of the software.

SUMMARY OF THE INVENTION

Generally, the present invention provides a technique which is close to the ideal. It is based upon distributing software in such a way that users must call a telephone number to get the software to work. If the telephone call is to a number which results in a per call service fee, such as a "900" number, then making the call guarantees that the users pay for the use of the software.

More specifically, an encryption program converts any existing program into a new program called the secured software. The secured software is a program that contains the original software in encoded form. The encryption program, when constructing the secured software, both compresses and encodes the original program. The compression removes most of the redundancy, making code-breaking difficult, and reduces the size of the secured software. The resulting program contains the original software in a completely unreadable form.

The developer may then distribute the secured software freely. To use the software, the user calls a telephone number, from which the user gets a number that the secured software uses to decode the encrypted computer program. This telephone number may be a number that results in a per call service fee, in which case the act of making the call guarantees that the user pays for the use of the software.

Several variations are possible. For example, the secured software may control dialing the telephone number through a modem and running the code transaction automatically. A single call might increment a counter in the software to allow multiple uses. Free telephone service, such as an "800" number, could readily be provided through which potential users can download secured software. Additional services might be readily provided.

To the software developer, the present invention provides an additional distribution source for which there is little cost—the encryption program in its simplest form does not have to be incorporated into the software. To the user, there is no difficulty with backups and no danger of losing a hardware or floppy disk key. All that is needed to run the software is a phone call. The user also has the option of trying out the software before spending a considerable amount to purchase it.

DETAILED DESCRIPTION

This invention is described with reference to various data encoding and decoding techniques. Thus, a brief explanation of basic cryptography follows.

Cryptographic systems generally transform data through the use of two basic elements, a cryptographic algorithm and keys. The cryptographic algorithm contains procedures for encoding and decoding the data. These encoding and decoding procedures are generally identical or may consist of the same steps performed in reverse order. The keys, which are selected by the users, consist of a sequence of numbers or characters, which are used by the cryptographic algorithm to code and decode the data. In the following detailed description we discuss two types of cryptographic systems.

The first type of system is the single key system. In this type of system a single key is used for both data encoding and decoding. Thus, in order to ensure protection, this key must be kept secret. In this description we refer to the Data Encryption Standard (DES) single key technique. This is a data encryption technique which has been accepted as a standard by the National Bureau of Standards, and is well known to one skilled in the art of cryptography.

Another type of system is a public key system. In this type of system, instead of using one key for both data encoding and decoding, two keys are used, one to encode the data and one to decode the data. Generally one key is made public and one key is kept private. If the public key is used to encode the data, then the private key is used to decode the data, and vice versa. An important aspect of this type of system is that it is impossible to deduce the private key from the public key. Public key cryptography is also well known to one skilled in the art of cryptography.

The data encryption and decryption techniques we discuss here are for illustrative purposes. Various other techniques could be substituted for those described herein without departing from the scope and spirit of the invention.

Figure 1:
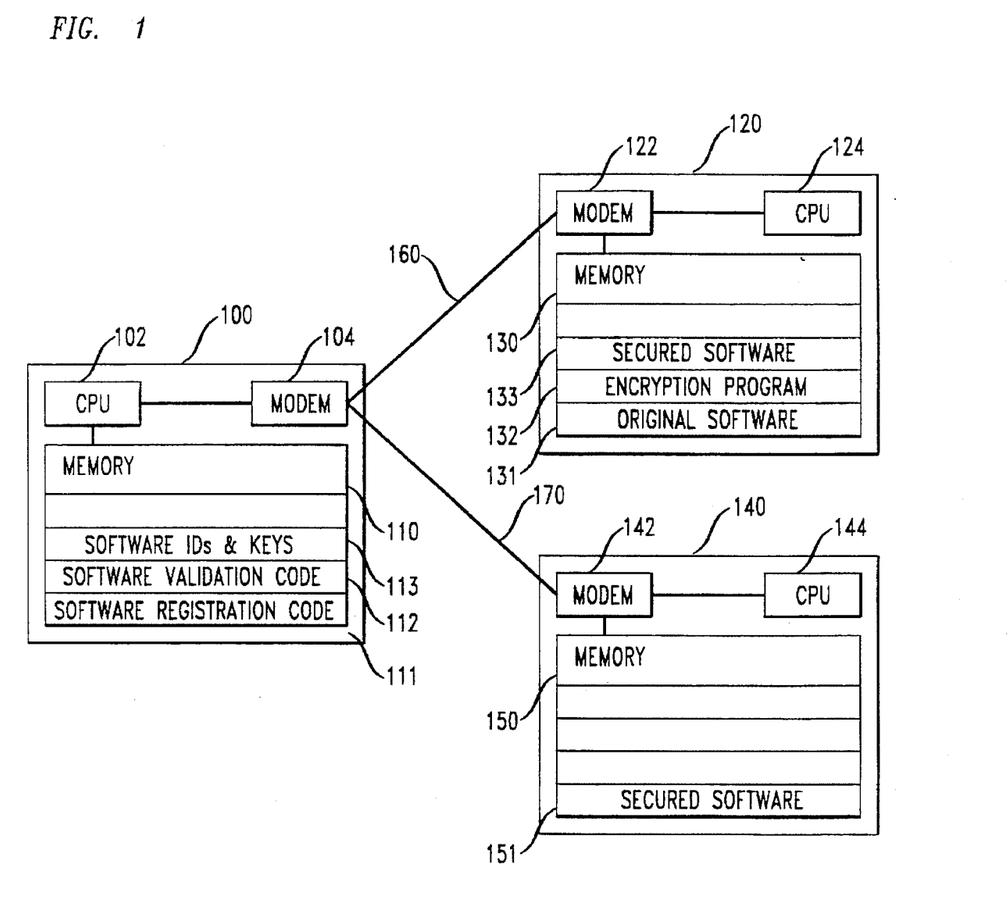
FIG. 1 is a block diagram of an implementation of the system of the present invention.

FIG. 1 illustrates one possible implementation of a system according to the present invention. The software validation system 100 comprises a central processing unit 102, a memory unit 110, and a modem 104. The central processing unit 102 is connected to the modem 104 and the memory unit 110. The memory 110 contains software registration program code 111 to implement the functions required during the software registration process, software validation program code 112 to implement the functions required during the software validation process, and a storage area 113 for the storage of software identification information and associated keys. The modem 104 is used to transmit data to and receive data from the software developer system 120 and the software user system 140.

The software developer system 120 comprises a central processing unit 124, a modem 122, and a memory unit 130. The central processing unit 124 is connected to the modem 122 and the memory unit 130. The memory unit 130 contains original software 131, an encryption program 132, and secured software 133 after it is generated. The original software 131 is the software the developer wishes to register and protect. The encryption program 132 is the program which interacts and communicates with the software validation system 100 during software registration and generation of the secured software 133. The secured software 133 contains an encrypted version of the original software 131 along with user validation software. This user validation software is program code that will interact and communicate with the software validation system 100 during software validation. These functions are described below in conjunction with FIGS. 2–5.

The software validation system 100 and the software developer system 120 communicate with each other over a communications network 160 through the modems 104 and 122. In one embodiment, the communications network 160 is a public telephone line.

The user system 140 comprises a central processing unit 144, a modem 142, and a memory unit 150. The central processing unit is connected to the modem 142 and the memory unit 150. The memory unit 150 contains a copy of the secured software 151, which comprises both the encrypted original software and the user validation software as discussed above. This secured software 151 is a copy of the secured software 133 which was generated by the software developer system 120.

The validation system 100 and the user system 140 communicate with each other over a communications network 170 through the modems 104 and 140. In one embodiment, this communications network 170 is a public telephone line, and the communication is initiated by the user system 140 dialing a telephone number which results in a per call service fee (e.g. a fee set for dialing a "900" number). This call would ensure that the user pays for each use of the software.

Figure 2:
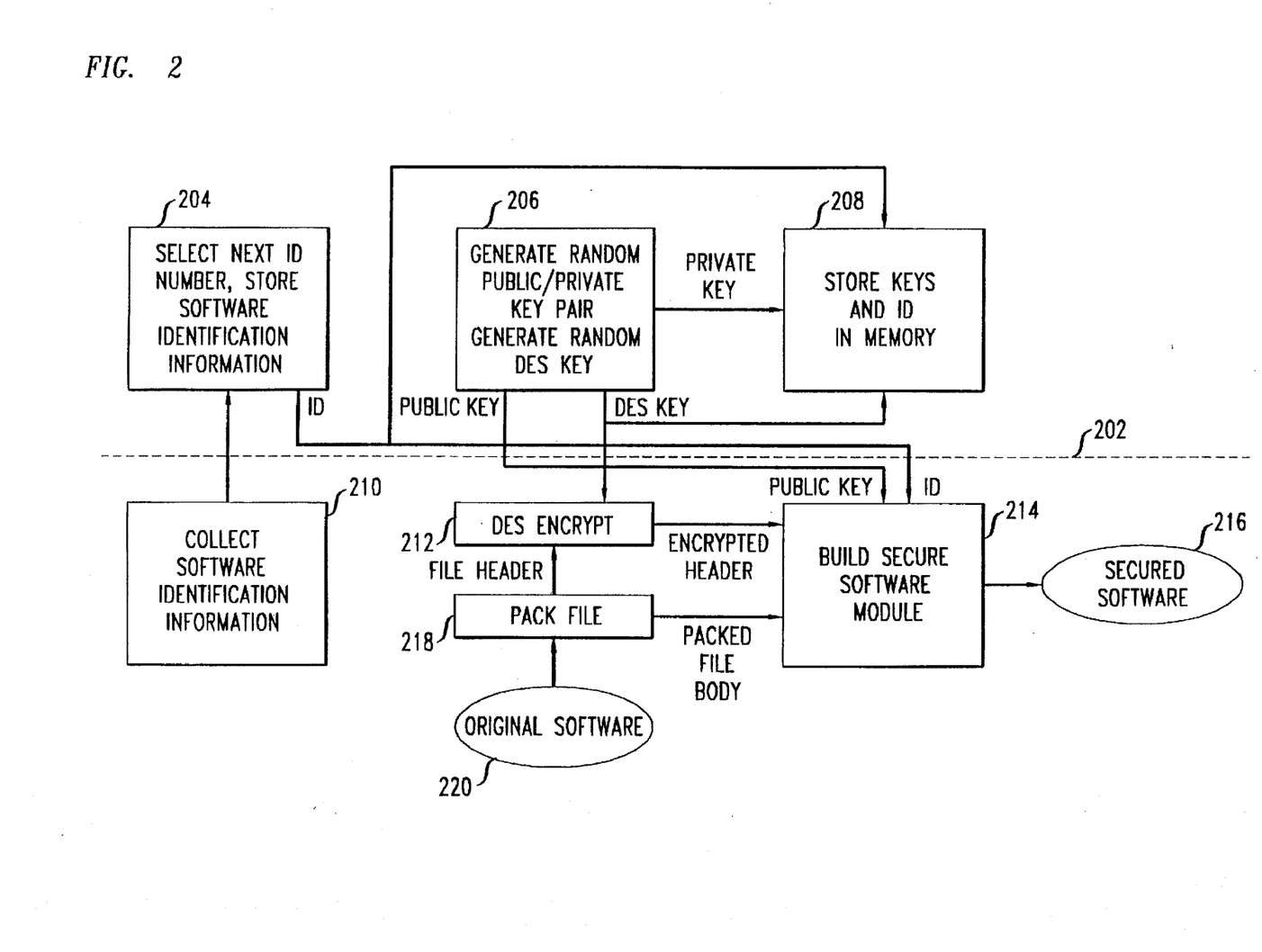
FIG. 2 is a block diagram illustrating software registration and generation of secured software.

The generation of the secured software 133 and the registration of the software with the software validation system is described with reference to FIG. 2. The broken line 202 represents the separation between the software developer system 120 and the software validation system 100. Figure elements shown above line 202 represent functions which are performed by the software validation system 100 by execution of the software registration code 111, and figure elements shown below line 202 represent functions which are performed by the software developer system 120 by execution of the encryption program 132. Data which is sent between the two systems must be transmitted across the communications network 160. The transmission of data over the communications network 160 is represented in FIG. 2 by lines crossing dividing line 202.

The first step 210 is for the software developer to collect software identification information. This information consists of the name of the software, the name of the software developer, the address of the software developer, and any other information which may be desired. This information is transmitted across the network 160 to the software validation system 100. In step 204 the software validation system 100 will store the software identification information in memory 113 and will select the next ID number for the software. This ID number is any unique identifier for the software. The validation system 100 then generates a random public/private key pair and generates a random DES key in step 206.

The generated random private key and the generated random DES key are stored in the software registration system memory 113 along with the software ID number in step 208. Returning now to the software developer system 120, the original software 220 is converted into a packed file in step 218. The method used to pack the original software may be any suitable data compression technique, such as Huffman encoding, which is well known in the art. This compression removes most of the redundancy in the software, making code breaking difficult, and reduces the size of the secured software. The file header from this packed file is then encrypted in step 212 using the DES key generated by the software validation system. Only the file header is encrypted since the packed file cannot be unpacked without the file header. Thus, sufficient protection is ensured by encrypting only the file header. The packed file body and the DES encrypted header which were generated by the software developer system 120, and the public key and the software ID which were generated by the software validation system 100, are then used to build the secured software in step 214. The secured software 216 may then be distributed to users for use in accordance with the invention. In order for a user to use the secured software, it must be converted into an executable module in accordance with the present invention.

Figure 3:
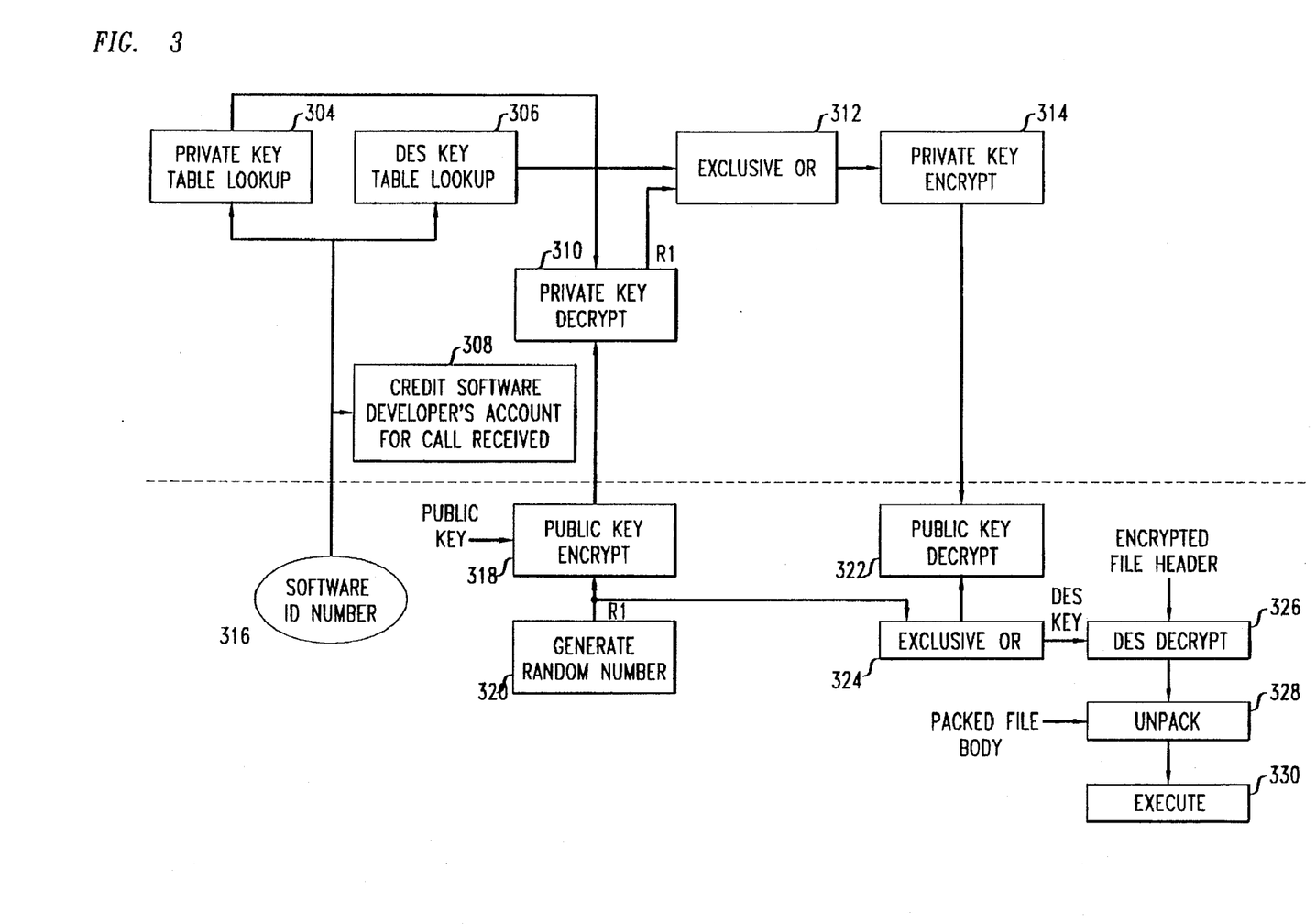
FIG. 3 is a block diagram of a first embodiment of a pay per use software validation technique.

A first embodiment of a pay per use validation technique is described in conjunction with FIG. 3. The broken line 302 represents a separation between the software validation system 100 and the user system 140. Figure elements shown above line 302 represent functions performed by the software validation system 100 by execution of the software validation code 112, and figure elements shown below line 302 represent functions performed by the user system 140 by execution of the user validation software portion of the secured software 151. Any data which is passed between the pay per use validation system 100 and the user system 140 is represented by lines crossing dividing line 302 and must be transmitted over the communications network 170. Data is most vulnerable to unauthorized access by an unauthorized user when it is transmitted over the communications network 170.

The first step 316 is to transmit the software ID number to the validation system 100. This is the unique ID number which was assigned to the software during the generation of the secured software (described in conjunction with FIG. 2). In step 308 the validation system 100 will use this ID number to credit the software developer's account for the use of the software. As discussed above, in one embodiment of the invention, a user must call a per call service fee telephone number in order to initiate communication over the communications network 170. Thus, the ID number allows the validation system 100 to credit the account of the developer of the software which is being validated. This ID number is also used to look up the private key in step 304 and the DES key in step 306, both of which were generated and stored in the validation system memory 113 during the software registration and generation of the secured software.

The user system generates a random number (R1) in step 320 and encrypts that random number with the public key in step 318. The random number is encrypted so that when it is transmitted to the validation system 100 over the communications network 170, a person attempting to circumvent the protection scheme could not intercept the random number. The validation system 100 will use the private key obtained in step 304 to decrypt the random number generated by the secured software in step 310. The decrypted random number (R1) is then exclusive ORed with the DES key in step 312. This results in a DES key masked by the random number generated by the user system. This masked DES key is then encrypted with the private key in step 314 and transmitted to the user system 140 over the communications network 170. The user system will then use the public key to decrypt the masked DES key in step 322. The result is the DES key masked by the random number (R1). This masked DES key is then unmasked by exclusive ORing it with the random number (R1) in step 324. The result is an unmasked, unencrypted DES key. This is the same DES key which was used to encrypt the original software. The DES key is then used to decrypt the encrypted file header in step 326. The result is an unencrypted file header which is then used to unpack the packed file body in step 328. The result is a software executable file which may then be executed 330 on the user system.

As discussed above, the weakest points in this validation process are where data is transmitted across the communications network 170 because it is at these points that an unauthorized user could most easily attempt to intercept and record the data that is being transmitted. One way to circumvent the secured software protection would be to alter the random number generation portion of the user validation code in the secured software 151 so that the same random number is always generated. Then the user calls the telephone number once, giving the fixed random number and records what comes back. Since the program has been altered to always generate this same random number, the information that was recorded is provided to the secured software upon each subsequent execution. One scheme to prevent such unauthorized use is described below in conjunction with a second embodiment of a pay per use validation technique.

Figure 4:
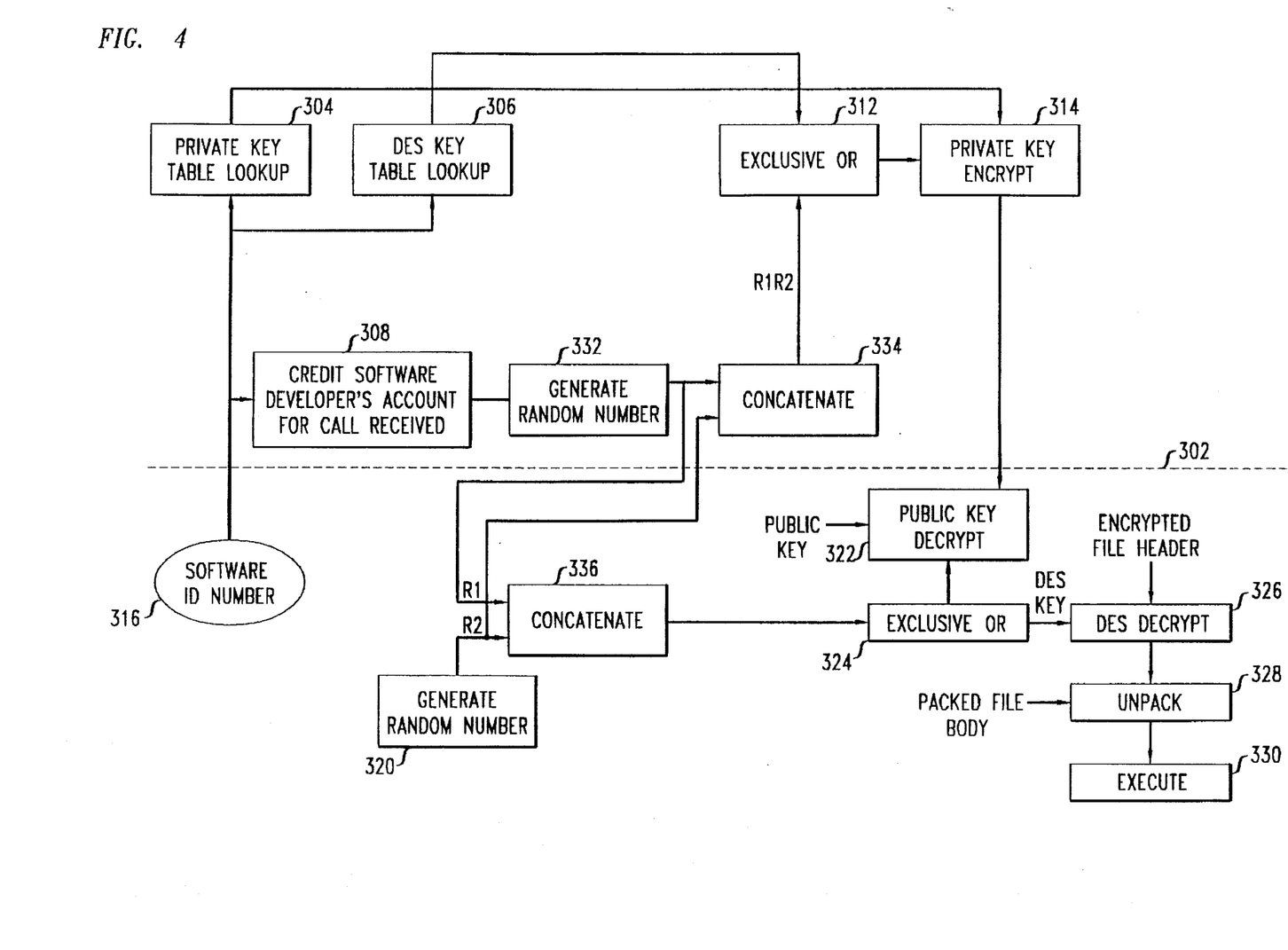
FIG. 4 is a block diagram of a second embodiment of a pay per use software validation technique adding random number generation by the validation system.

This second embodiment is described in conjunction with FIG. 4. In this embodiment, a second random number is generated in the validation system 100. This random number is concatenated with the random number from the user system 140, and the combined random number is used to mask and unmask the DES key. This will be clear from the following description of this embodiment in conjunction with FIG. 4. This second embodiment is similar to the first embodiment shown in FIG. 3. Thus, only the differences between the two embodiments will be discussed here. Like numbered elements in FIGS. 3 and 4 perform like functions.

In the second embodiment, both the validation system 100 and the user system 140 generate random numbers at steps 320 and 332. In step 334 the validation system 100 concatenates the random number (R1) it generated and the random number (R2) generated by user system. The resulting random number (R1R2) is then exclusive ORed with the DES key in step 312 to produce a masked DES key as discussed in conjunction with FIG. 3. The user system 140, like the validation system 100, concatenates the random numbers R1 and R2 in step 336. The resulting random number (R1R2) is then used to unmask the DES key in step 324 as discussed above in conjunction with FIG. 3. The remainder of the functions of embodiment two are the same as described in conjunction with embodiment one and FIG. 3.

This second embodiment as shown in FIG. 4 adds extra protection to the first embodiment discussed in conjunction with FIG. 3. Since the validation system 100 also generates a random number and then concatenates that random number with the random number generated by the user system 140, the masking of the DES key depends upon both generated random numbers. Thus, even if a user could fix the random numbered generated by the secured software to be the same each time, the random number generated by the validation scheme would be different and therefore, the user could not correctly unmask the DES key.

Figure 5:
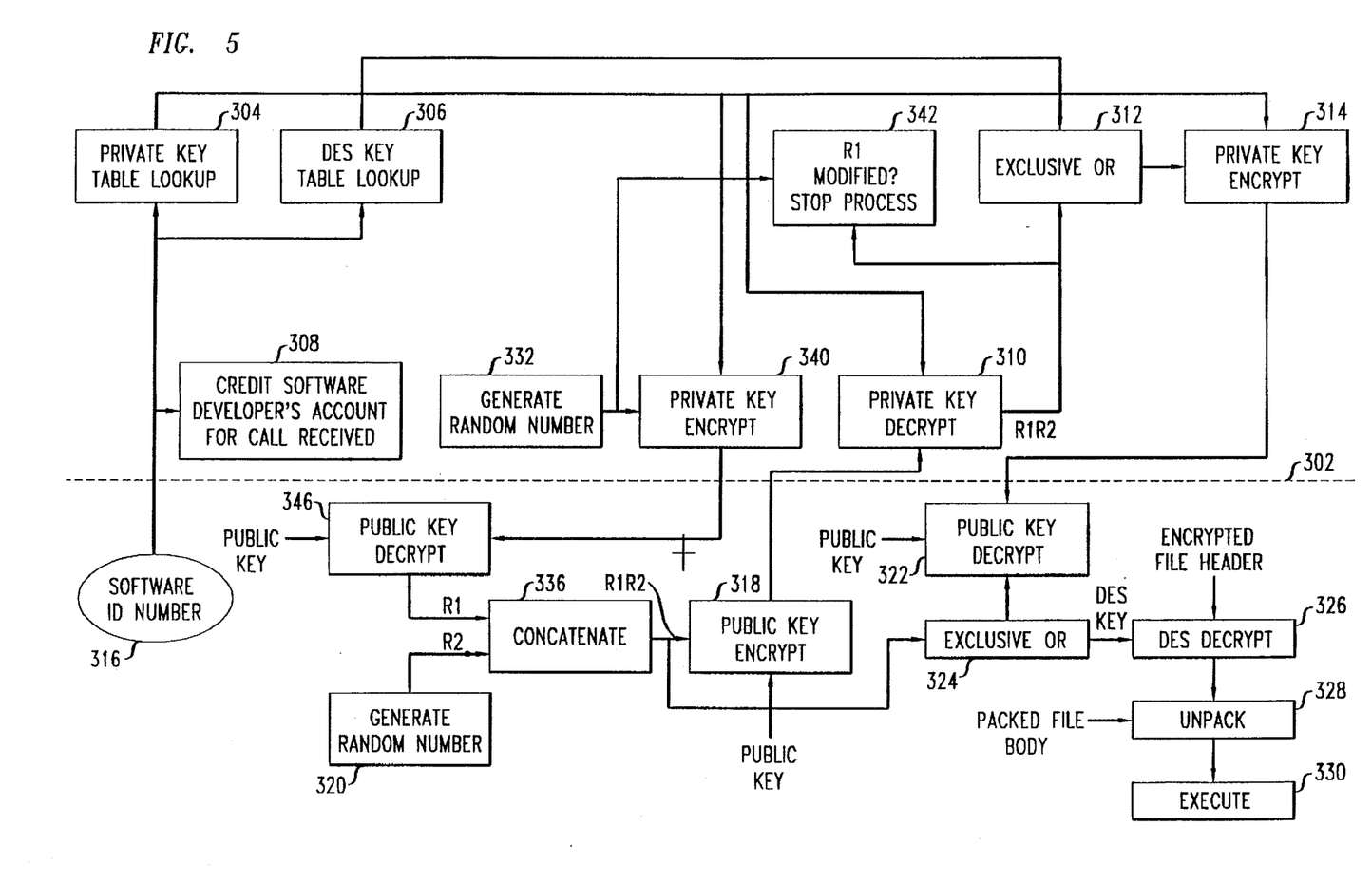
FIG. 5 is a block diagram of a third embodiment of a pay per use software validation technique adding encryption of the generated random numbers.

A third embodiment of a validation technique according to the present invention is discussed in conjunction with FIG. 5. This embodiment adds several features to the embodiments shown in FIGS. 3 and 4. The random number (R1) generated in the validation system 100 is encrypted before being transmitted to the user system 140. Also, the random number (R2) generated by the user system 140 is not itself transmitted to the validation system 100. These details will become clear from the following discussion of FIG. 5. The elements of the embodiment shown in FIG. 5 which are the same as those already discussed in conjunction with FIGS. 3 and 4 will not be discussed in detail here. Only the additional steps of the embodiment shown in FIG. 5 will be described below. Elements in FIG. 5 with like numbers to elements in FIGS. 3 and 4 perform like functions.

Referring now to FIG. 5, the random number (R1) generated by the validation system in step 332 is encrypted with the private key in step 340 before being transmitted to the user system. The encrypted random number is decrypted by the user system in step 346 and is then concatenated in step 336 with the random number (R2) generated by the user system in step 320. The resulting concatenated random number (R1R2) is then encrypted with the public key in step 318 and transmitted to the validation system. The encrypted random number is then decrypted by the validation system in step 310. The validation system, in step 342, then checks to determine whether the random number it generated in step 332 (R1) is the same as the R1 portion of the random number returned by the secured software. If R1 has been modified, it indicates that the random number has been manipulated in some way by the user in an attempt to defeat the protection, and the process is halted. Otherwise, the validation system uses the concatenated random number to mask the DES key in step 312. The system then continues in a manner similar to that explained above in connection with the embodiments of FIGS. 3 and 4.

In the embodiment of FIG. 5, the random number (R1) is encrypted before being transmitted from the validation system to the user system. Similarly, the concatenated random number R1R2 is encrypted before being transmitted from the user system to the validation system. Note that the random number (R2) generated by the user system is never itself transmitted to the validation system. These techniques make it more difficult for an unauthorized user to defeat the protection scheme by altering the random number generated by the user system 140.

There are other possible techniques for the prevention of piracy by altering the random number generation. One technique is to not generate or keep a direct, complete copy of the random number in the user system. This approach will make it difficult for a user to determine exactly what the current random number is by directly examining memory. For example, the random number could be provided by adding or exclusive ORing several bytes in memory. The random number is then generated in the user's system only when needed and only one byte (or word) at a time exists in a readable form in the system. Another technique to prevent the altering of the random number generation is to do a cyclical redundancy check of the secured program code to make sure it has not been modified to provide a fixed random number. Another technique is to include as part of the random number some easily verified information, such as the approximate time. Then, when the secured software code uses the random number, it can determine if the time information is correct. If not, the random number may have been altered and the system could abort. These techniques for preventing piracy through the random number generation are given as examples only and are not exhaustive. One skilled in the art could implement these, and other techniques in order to prevent piracy through manipulation of the random numbers generated by the user system 140 and the software validation system 100.

Another possible way to attempt to circumvent the software protection could be to examine memory of the user system after the DES key is received and decoded. This approach might reveal the DES key and could render the security features of the system ineffective. There are several techniques which would prevent this piracy. One technique is to split the program code into several segments each with a separate DES key. The above described decryption techniques could be repeated several times to prevent having all necessary DES keys in memory simultaneously. Another technique would be to store segments of the DES key in several places in memory so as to make finding the entire DES key more difficult. Another technique makes use of the fact that storing segments of the DES key in indirect form in memory will make determining the key difficult. For example, by exclusive ORing sections of the key with other random sections of memory when needed, would prevent an exact copy of any part of the DES key from ever existing in memory. Examination of several locations in memory would be necessary to determine each byte of the DES key. One skilled in the art could implement these and other techniques to prevent piracy by examining memory to determine the DES key.

Another possible piracy technique could be to examine and copy the memory of the user system after the secured software has been decoded. At this point, the original software exits in an executable format in the user system. There are several possible techniques to prevent this type of piracy. For example, an interrupt routine based on a timer interrupt could be added to the secured software. This routine would examine the program counter in the user system central processing unit and would eliminate or overwrite the program from memory once the program counter information indicates that the program is no longer running. Another technique is to arbitrarily complement sectors on the disk where the program is stored to indicate that the program is running and to complement those sectors again when the program is finished in order to restore those sectors. This would make a copy of the program from memory that does not go through the normal startup/finish sequence damaging to the information on the disk. The program state could not be captured at an arbitrary point, saved to disk, and later restored for further executions. The disadvantage is that power outages, resets, or other abnormal terminations would leave the disk in the altered state. Another technique would be to encode the system time into the program's memory image, and check it with the current system time on a frequent basis. The program could be eliminated if the system time has large discontinuities that indicate the program may have been saved and restored for later execution. Yet another technique would be to encode sensitive information about the user into the program's memory image. This could be a credit card number or the user's phone number. This would not only discourage giving away copies of executable memory images illegally saved, but would also allow traceback to the source of the de-secured or altered software. One skilled in the art could implement these and other techniques to prevent piracy by copying an executable copy of the program from memory.

In addition to the above, various other security enhancements are possible. For example, a developer's toolkit could provide methods of charging other than on a per use basis. This might include charging by the number of files created, by the hour or day, etc. Also, it might be possible to allow single calls to more expensive telephone numbers to authorize multiple uses. For example, if each use cost $0.75 on a per use basis, a call to another number might cost $5.00 and authorize 10 uses, while another number might cost $50.00 and authorize 500 uses, giving the user a substantial volume discount. These "developer's toolkit" derived versions of the secured software would have to be able to save themselves on disk in a semi-secured form with a software counter that keeps track of the number of executions/operations left. It would also be considerably easier to make unauthorized copies and illegally distribute copies with the "counters" set to high values. Embedding the user's verified credit card number and phone number would probably prevent most people from distributing illegal copies. Another way to trace illegal copies of semi-secured discount volume usage software would be to randomly, for example once every 5-10 executions, erase a byte of the program's image from memory and disk, and then require the user to call a telephone number. The user would then provide the number displayed on the screen, for example the program ID and the erased address, and the telephone response system would give back what was missing. In this way a record of telephone numbers is generated of users with semi-secured volume usage software. If a comparison of this number list generated large call volumes from numbers that were not on the per call service fee number list, then those numbers may have illegal copies of unsecured software. With a developer's toolkit, random combinations of security methods might be applied to a particular piece of software so that the methods for securing different pieces of software are different. Developing a method to break one software package would not be applicable to later versions of the same or different software packages. These and other security techniques to prevent the unauthorized decryption of the secured software could be readily implemented by those skilled in the art.

In each of the embodiments described above, there are several possible variations for the transmission of data between the validation system 100 and the user system 140. In the simplest, a user may call a telephone number and speak to a person who has access to the validation system. The two human operators could communicate the information orally. The software user would then provide the required information to the user system. Another variation would be for the user to call a telephone number which connects the user to an automated response system connected to the validation system. In this case, the user could use a telephone keypad to pass information to the validation system, and the validation system could pass information back to the user by voice synthesis or recording. A further variation would be to transmit data between the systems via modem. In this way, the user system would communicate directly with the validation system via electronic communications. Thus, the validation of the secured software would be almost transparent to the user.

It is to be understood that the embodiments and variations shown and described herein are illustrative of the principles of this invention only and that various modifications may be implemented by those skilled in the art without departing from the scope and spirit of the invention.

We claim:

1. A system for the validation and use of secured computer software, said secured computer software including encrypted computer program code and user validation program code, said system comprising:
   a software validation system;
   a software user system;
   a communications network connected to the software validation system and the software user system for the transmission of data between the systems;
   said software validation system comprising:
      means for storing at least one decryption key,
      means for receiving from said software user system over said communications network an identification of secured software,
      means for recording the receipt of said identification of secured software, and
      means for transmitting to said software user system over said communications network a decryption key chosen from said at least one stored decryption key;
   said software user system further comprising:
      means for transmitting said secured software identification to the software validation system over said communications network,
      means for receiving said decryption key from said software validation system over said communications network,
      means for decrypting said encrypted computer program code using said chosen decryption key;
      processor means for executing said decrypted computer program code; and
      means for preventing the decryption of said encrypted computer program code and execution of said decrypted computer program code unless said secured software identification is transmitted to the validation system over the communications network prior to each and every execution of said decrypted computer program code.

2. The system of claim 1 wherein the communication over said communications network is initiated by a telephone call to a per call service fee telephone number.

3. An end user computer system for the controlled use of secured software, the system comprising:
   secured software including encrypted user program code and user validation code;
   means for transmitting to a software validation system an identification of the secured software;
   means for receiving a decryption key from the software validation system;
   means for decrypting said encrypted user program code with said decryption key;
   processor means for executing said decrypted user program code; and
   wherein said user validation code comprises enforcement means for preventing the deception and execution of said encrypted user program code unless said identification of the secured software is transmitted to said software validation system and said decryption key is received from the software validation system prior to each and every attempted use of the secured software.

4. The end user computer system of claim 3 wherein said means for transmitting further comprise means for transmitting over a communications network, and wherein communication over the communications network is initiated by a telephone call to a per call service fee telephone number.

5. The end user computer system of claim 3 wherein said received decryption key has been masked prior to receipt, the system further comprising:
   means for generating a random number;
   means for transmitting said random number to the software validation system; and
   means for unmasking said masked decryption key with said random number.

6. The end user computer system of claim 3 wherein said decryption key has been masked prior to receipt, said enforcement means further comprising:
   means for generating a pseudo-random number which includes verifiable information;
   means for transmitting said pseudo-random number to the software validation system; and
   means for unmasking said masked decryption key with said pseudo-random number only if said verifiable information is verified.

7. The end user computer system of claim 3 further comprising:
   a memory unit connected to said processor means, said memory unit comprising a plurality of memory locations,
   wherein said enforcement means further comprises:
      means for storing a first portion of said decryption key in a first memory location; and
      means for storing a second portion of said decryption key in a second memory location.

8. The end user computer system of claim 3 further comprising a memory unit for the storage of the decrypted user program code wherein said enforcement means further comprises:
   means for determining whether said execution of the decrypted user program code has stopped; and
   means for deleting said decrypted user program code from said memory unit when execution of said user program code stops.

9. An end user computer system for the controlled execution of secured software, the system comprising:
   secured software including encrypted user program code and user validation code;
   means for transmitting to a software validation system an identification of the secured software;
   means for generating a first random number;
   means for receiving from said software validation system a second random number;
   means for combining said first and second random number to produce a third random number;
   means for receiving from said software validation system a masked decryption key;
   means for unmasking said masked decryption key with said third random number;
   means for decrypting said encrypted user program code with said decryption key;

processor means for executing said decrypted user program code; and wherein said user validation code comprises enforcement means for preventing the decryption and execution of said user program code unless said identification of the secured software is transmitted to said software validation system prior to each and every attempted use of said secured software.

10. The end user computer system of claim 9 wherein said means for transmitting further comprises means for transmitting over a communications network, and wherein communication over the communications network is initiated by a telephone call to a per use service fee telephone number.

11. The end user computer system of claim 9 wherein said masked decryption key is encrypted prior to receipt, said system further comprising means for decrypting said masked decryption key prior to unmasking said decryption key.

12. The end user computer system of claim 9 wherein said second random number is encrypted prior to receipt and said masked decryption key is encrypted prior to receipt, said system further comprising:

means for decrypting said masked decryption key prior to unmasking said decryption key; and means for decrypting said second random number prior to combining said first random number and second random number.

13. A method for the operation of a software validation computer system and an end user computer system for the validation and use of secured software, said secured software including encrypted user program code and user validation code, said method comprising the steps of:

transmitting secured software identification from the end user computer system to the software validation computer system prior to each and every use of the secured software;

transmitting a decryption key from said software validation computer system to said end user computer system prior to each and every use of the secured software;

decrypting said encrypted user program code with said decryption key in said end user computer system;

executing said decrypted user program code in said end user computer system; and preventing the decryption of said encrypted user program code unless said step of transmitting secured software identification has occurred.

14. A method for the operation of an end user computer system for the controlled use of secured software, said secured software including encrypted user program code and user validation program code, the method comprising the steps of:

transmitting an identification of secured software to a software validation system;

receiving a decryption key from the software validation system;

decrypting said encrypted user program code with said decryption key;

executing said decrypted user program code; and preventing the unauthorized decryption and execution of said encrypted user program code if said identification of secured software is not transmitted to said software validation system prior to each and every execution of said user program code.

15. The method of claim 14 wherein said steps of transmitting further comprise the step of transmitting over a communications network, wherein the establishment of communication over the communications network comprises the step of placing a telephone call to a per call service fee telephone number.

16. The method of claim 14 wherein said received decryption key has been masked prior to receipt, the method further comprising the steps of:

generating a random number;

transmitting said random number to the software validation system; and unmasking said masked decryption key with said random number.

17. The method of claim 14 wherein said received decryption key has been masked and encrypted prior to receipt, the method further comprising the steps of:

decrypting said encrypted masked decryption key;

generating a random number;

transmitting said random number to the software validation system; and unmasking said decrypted masked decryption key with said random number.

18. The method of claim 14 wherein said decryption key has been masked prior to receipt, said step of preventing the unauthorized decryption and execution of said encrypted user program code further comprising the steps of:

generating a pseudo-random number which includes verifiable information;

transmitting said pseudo-random number to the software validation system; and unmasking said masked decryption key with said pseudo-random number only if said verifiable information is verified.

19. A method for the controlled execution of secured software in a computer system, said secured software including encrypted user program code and user validation code, the method comprising the steps of:

transmitting a software identification identifying the secured software to a software validation system;

generating a first random number;

receiving a second random number from the software validation system;

combining said first and second random number to produce a third random number;

receiving a masked decryption key from the software validation system;

unmasking said masked decryption key with said third random number;

decrypting said encrypted user program code with said decryption key;

executing the decrypted user program code; and preventing the unauthorized decryption and execution of said encrypted user program code if said identification identifying the secured software is not transmitted to said software validation system prior to each and every attempted execution of said user program code.

20. The method of claim 19 wherein said step of transmitting further comprises the step of:

initiating communication over a communications network by placing a telephone call to a per call service fee telephone number.

21. The method of claim 19 wherein said masked decryption key is encrypted prior to receipt, said method further comprising the step of decrypting said encrypted masked key prior to unmasking said key.

22. The method of claim 19 wherein said second random number is encrypted prior to receipt and said masked decryption key is encrypted prior to receipt, said method further comprising the steps of:

decrypting said encrypted masked key prior to unmasking said key; and decrypting said encrypted second random number prior to combining said first random number and second random number.

23. A storage medium for storing data accessible by a computer system during a usage session, said storage medium comprising:

a first storage area for the storage of encrypted data;

a second storage area for the storage of a validation program, said validation program comprising computer program instructions for execution on said computer system, said computer program instructions comprising:

a first set of instructions for transmitting an identification of said encrypted data to a validation system;

a second set of instruction, for decrypting said encrypted data with a decryption key received from said validation system and for producing unencrypted data accessible by said computer system during said usage session; and a third set of instructions for preventing the execution of said second set of instructions during a usage session if said first set of instructions has not been executed prior to said usage session.

24. The storage medium of claim 23 wherein said storage medium is a magnetic disk.

25. The storage medium of claim 23 wherein said storage medium is an optical disk.

* * * * *